UNITED STATES PATENT OFFICE.

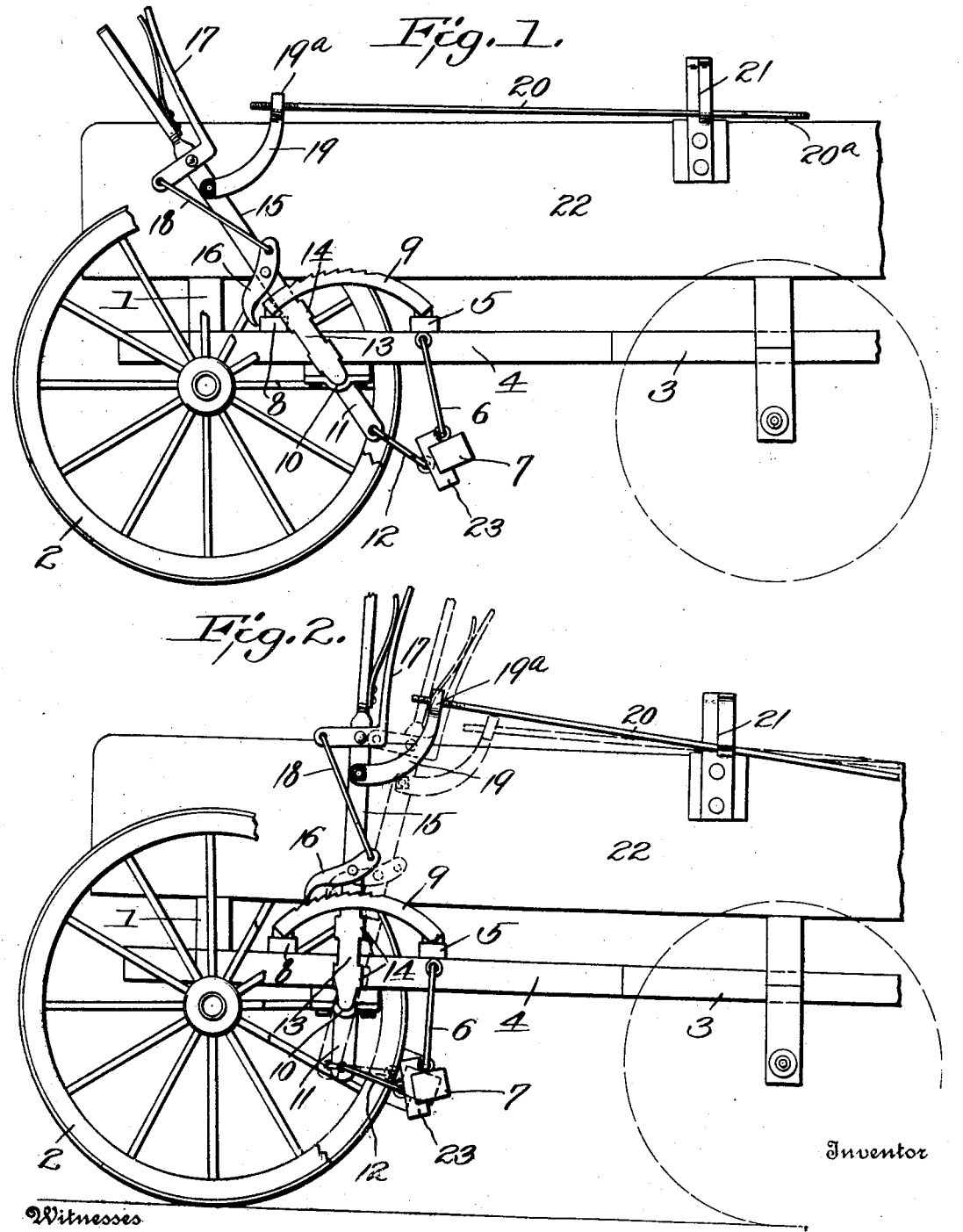

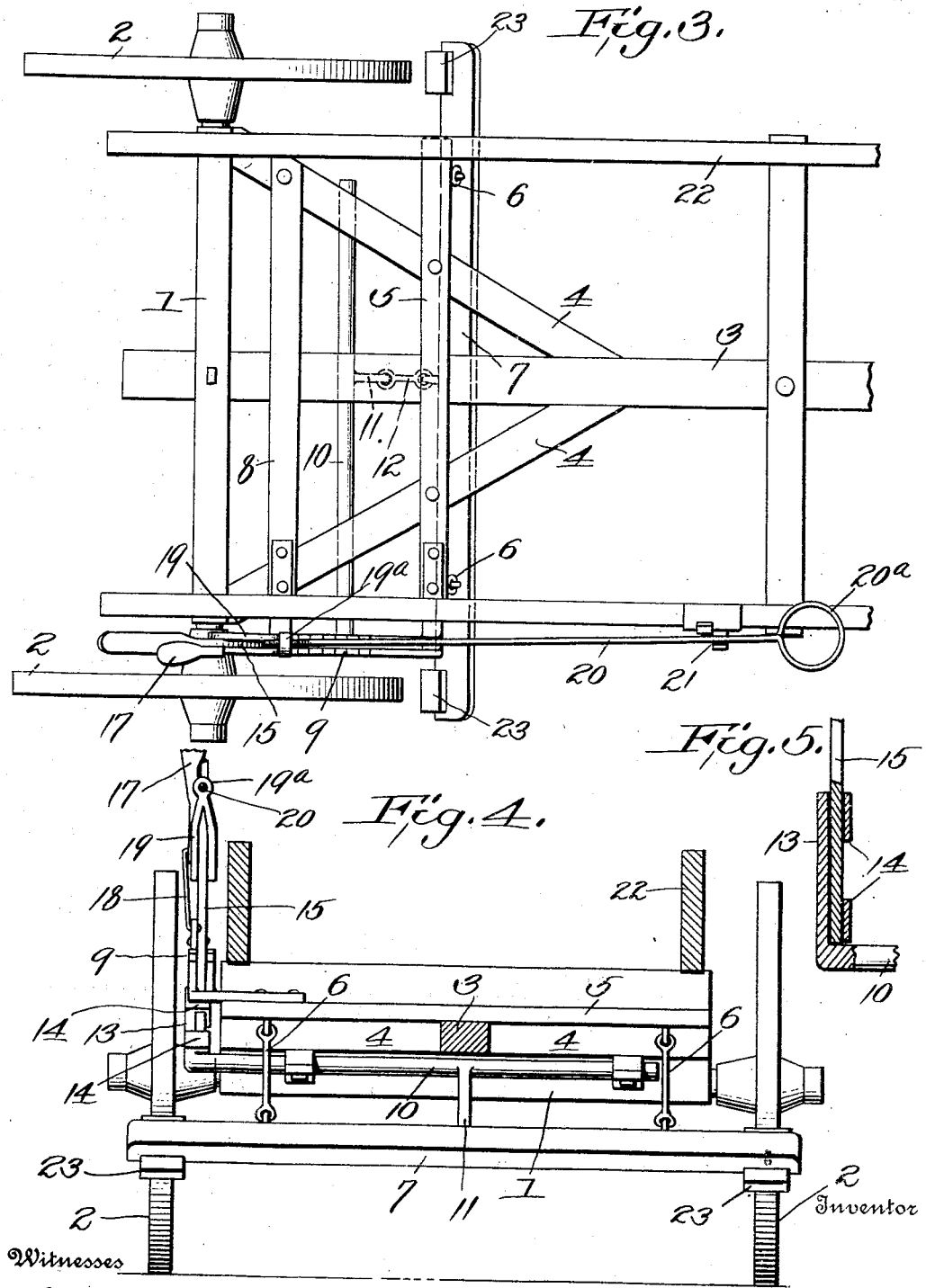

JOHN PAUL HISE, OF HIGHTOWN, VIRGINIA.

WAGON-BRAKE.

1,045,978.  Specification of Letters Patent.  Patented Dec. 3, 1912.

Application filed November 21, 1911. Serial No. 661,496.

*To all whom it may concern:*

Be it known that I, JOHN P. HISE, a citizen of the United States, residing at Hightown, in the county of Highland and State of Virginia, have invented a new and useful Improvement in Wagon-Brakes, of which the following is a specification.

This invention relates to a wagon brake the object of the invention is to permit the application of the brake regardless of whether a wagon bed is or is not used, and a further object of the invention is to avoid the loosening of the brake due to the sliding of the wagon bed, as frequently occurs when the brake operating lever is connected to the bed.

The invention consists of the novel features of construction hereinafter described, pointed out in the claim and shown in the accompanying drawings, in which:

Figure 1 is a side elevation, the brake mechanism being shown in normal position. Fig. 2 is a side elevation the brake mechanism being shown in full lines with the brake shoe in its first position of contact with the wheel, the position of the parts when the braking mechanism is in full operative position being shown by dotted lines. Fig. 3 is a plan view of the rear portion of the running gear with my brake applied thereto. Fig. 4 is a section on the line 4—4 of Fig. 3 looking to the rear. Fig. 5 is a detail sectional view illustrating a socket for receiving an operating lever.

In these drawings 1 represents the rear bolster, 2 the rear wheels, 3 the reach, and 4 the hounds, these all being parts of the ordinary wagon construction. Extending transversely across the forward portion of the hounds and secured thereon is a beam 5 from which depends links 6, which are loosely connected to a brake beam 7, said beam normally hanging in the forwardly and downwardly slanting position as shown in Fig. 1. Secured to and extending across the rear portion of the hounds is a second beam 8 and a curved rack bar 9 has its ends mounted respectively upon end portions of the beams 5 and 8. Rotatably mounted in suitable bearings carried by the under sides of the hounds and between the beams 5 and 8 is a rock shaft 10 having midway its ends a depending and normally forwardly extending arm 11, to which is pivotally connected a link 12, which in turn is pivotally connected to the rear face of the brake beam 7. One end of the shaft 10 is bent upwardly as shown at 13, and carries alining sleeves or sockets 14 adapted to receive the lower end of a brake lever 15. Pivoted upon the lever 15 is a pawl 16 which works over the curved rack 9. An angled hand grip 17 pivotally carried by the lever 15 is connected to the pawl 16 by a link 18. The curved arm 19 is pivotally connected to the lever 15 and is provided at its upper end with a threaded eye, 19ª into which is threaded the rear end of a pull rod 20, said rod having a loop 20ª at its forward end and working between suitable guides 21 carried by the wagon bed 22. Brake shoes 23 are carried by the beam 7.

As the lever 15 is pulled forward the shaft 10 is rocked and the beam 7 swung into the position shown in Fig. 2, the upper rear edges of the brake shoes first striking the wheels. As the lever is drawn still farther forward the brake shoes will turn upon this edge as the fulcrum until the parts are in the position shown in the dotted lines in Fig. 2. This makes an exceedingly tight lock and as the operating lever and the rack bar 9 are both supported from the running gear any sliding movement of the wagon bed will not loosen the brakes by reason of corresponding movement on the part of the lever. It will be further obvious that by means of this construction the removal of the wagon bed does not interfere in any way with the use of the brake, as is the case in constructions in which the operating lever or the rack bar are connected with the wagon bed. Furthermore this construction adds to the life of the wagon bed as none of the strain due to the applying of the brake is thrown upon the wagon bed when in use, and furthermore the brake lever can be lifted out and entirely removed when in the way in loading or unloading the wagon.

What I claim is:—

In a wagon brake, the combination with a brake beam, and shoes carried thereby, of a rotatable rod having an integral upturned end portion, said end portion being provided with alining sleeves, a brake lever detachably fitting in said sleeves, and means for connecting said rod to said brake beam.

JOHN PAUL HISE.

Witnesses:
CHARLES P. JONES,
IRA D. GUTSHALL.

Copies of this patent may be obtained for five cents each, by addressing the "Commissioner of Patents, Washington, D. C."